Jan. 21, 1936.  F. R. BURNS  2,028,435
DEVICE FOR GLAZING DOUGHNUTS
Filed June 10, 1935
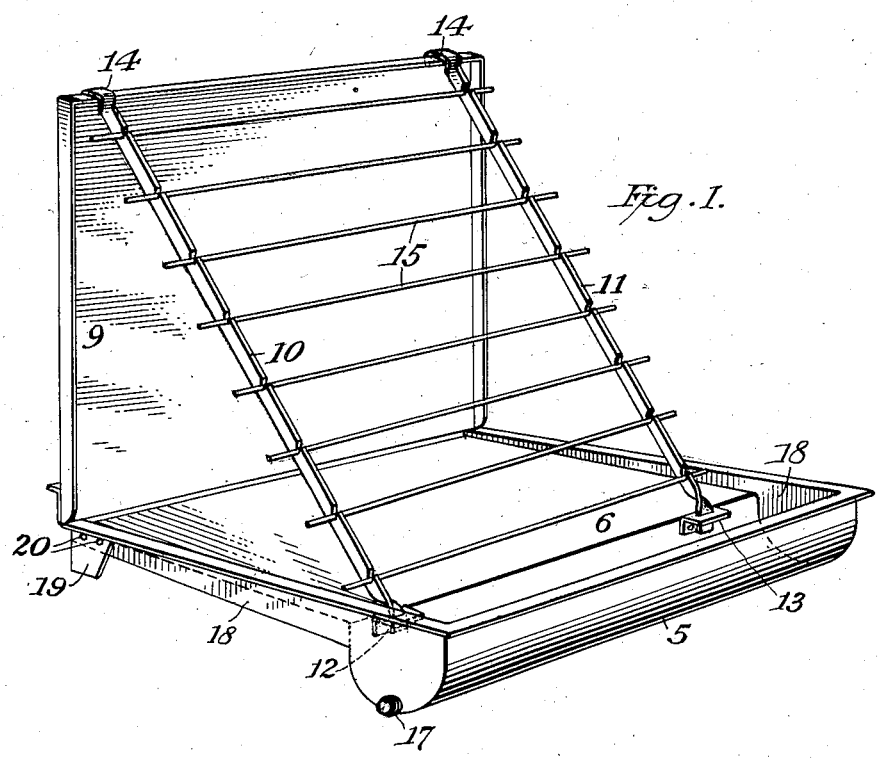
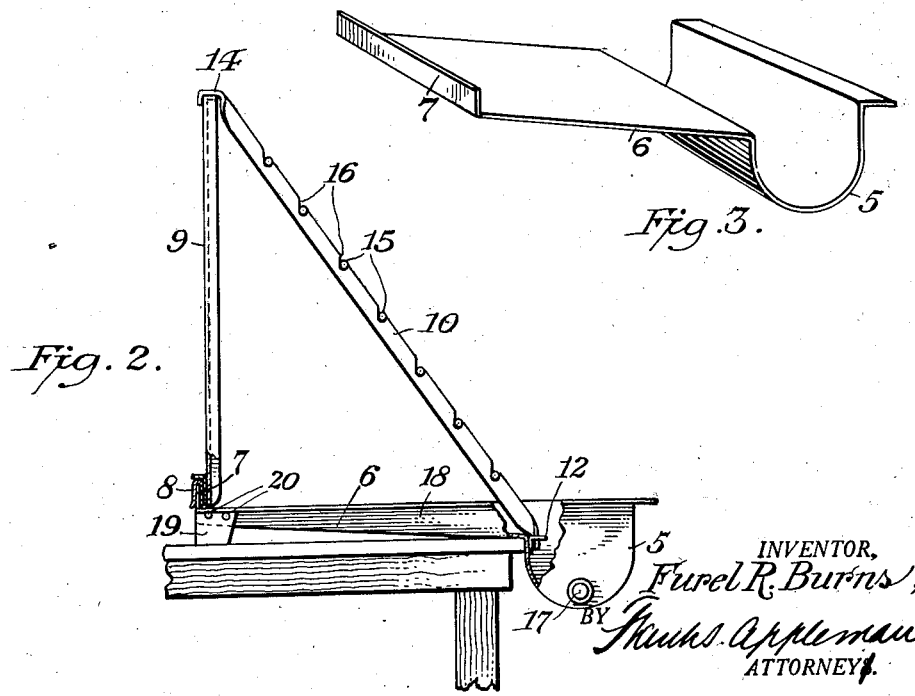
INVENTOR,
Furel R. Burns,
BY
ATTORNEY.

Patented Jan. 21, 1936

2,028,435

UNITED STATES PATENT OFFICE 2,028,435

DEVICE FOR GLAZING DOUGHNUTS

Furel R. Burns, Mentone, Ind.

Application June 10, 1935, Serial No. 25,949

3 Claims. (Cl. 91—4)

This invention relates to a device for glazing doughnuts including the provision of means for supporting doughnuts while the excess coating drips therefrom and the coating itself sets to a degree that the doughnuts can be handled without unduly affecting the said coating.

It is an object of the invention to provide a receptacle for containing the material into which the doughnuts are immersed for coating them and to provide novel means whereby a plurality of doughnuts may be simultaneously immersed and then suspended in such relation to the receptacle as to cause any excess coating that may drip therefrom to find its way back to the receptacle into which the doughnuts were immersed.

It is a further object of this invention to provide a receptacle or tank and to equip the same with an inclined or sloping bottom discharging into that portion of the tank or pan in which the doughnuts are immersed.

It is a further object of the invention to provide a rack for holding a plurality of doughnut-suspending means, which means comprise rods on which the doughnuts are threaded, the said rack having seats or recesses into which the rods are lodged while the coating of the doughnuts is drying.

It is a further object of this invention to provide means for supporting the racks in an inclined position and to make the parts of the device detachable, one from the other, in order that they can be manipulated expeditiously in assembling or dismantling the parts thereof.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in perspective of a tank and parts associated therewith;

Figure 2 illustrates an end view thereof, partly in section; and

Figure 3 illustrates a perspective view of the drain and trough.

In the drawing 5 denotes a trough for containing the doughnut coating material, which trough is preferably formed integral with an inclined rearward extension 6 on which the excess coating of the doughnuts drips and from which it gravitates to the trough 5. The rearwardly extending portion 6 terminates in an upwardly disposed flange 7 with which the curved flange 8 of the upstanding back plate 9 interengages in a manner to hold the back plate in position to support the rack members 10 and 11 in an inclined position as will presently appear.

The lower ends of the rack members 10 and 11 are anchored in ears or lugs 12 and 13 respectively and these ears or lugs may be attached to the structure at the junction of the trough and the inclined extension 6. As shown in the drawing, the upper ends of the rack members are formed to produce hooks such as 14 and partially embrace the upper edge of the back plate and the joints between the rack members at their ends as heretofore described tend to retain the rack members in positions to support the rods 15 on which doughnuts are threaded before they are immersed in the coating fluid.

As shown in the drawing, the rack members are provided with a series of notches or seats 16 which serve to retain the rods in positions of adjustment so that the said rods are stepped to permit the coating to drip from one series of doughnuts without encountering the doughnuts of another series.

A drain cock or opening 17 is provided in the end of the tank for removing excess coating material or to permit circulation of a cleaning agent after the coating operations have been performed.

The trough and parts associated with it have end plates 18 secured thereto in any appropriate way as by welding or other well known agencies known in metal working practice and the inventor does not wish to be limited with respect to the features of construction or assembly and as to matters just mentioned. The pan and parts associated with it are supported by legs 19 located at the rear end thereof and these legs may be attached to the side members in appropriate way as by fastenings 20 such as spot welding or other means.

It is apparent from what has been said that a glazer embodying this invention is sanitary and that it results in an economical process of glazing doughnuts in that the excess coating is reclaimed for re-use as it finds its way down the drip surface to the tank and also in the time consumed in the operation. Of course, the proportions may be such as to operate in conjunction with a greater number of doughnuts and the inventor does not wish to be limited with respect to proportions.

It is believed that the construction and manner of use of the invention will be apparent from the foregoing disclosure and a résumé of the operation is believed unnecessary to an understanding of the invention by one skilled in the art.

It will be understood that if it is desired to operate with the trough resting on the same plane as the legs, the legs would of course be made longer in order to give the required pitch to the drain.

I claim:

1. In a doughnut glazer, a trough having a rearwardly extending inclined drain, a back plate detachably connected to the said drain, racks supported in an inclined position with respect to the drain and the said trough, said racks having rod-retaining seats and rods adapted to receive doughnuts applied to said racks.

2. In a doughnut glazing device, a trough having a rearward extension forming a drain, means for supporting the said trough, a back plate detachably connected to the rear of said extension, racks having hooks partially embracing the upper edge of the back plate, means associated with the trough near its outer edge for holding the rack members at their lower ends whereby the rack members are held in an inclined position, said rack members having recesses forming seats for rods, and doughnut holding rods applied to said seats.

3. In a roughnut glazing device, a trough having a draining means and a rearward extension, means for supporting the said extension on an incline tending to cause drainage toward the trough, a back plate removably secured to the said extension, rack members anchored in operative relation to said back plate and said trough, rods for holding doughnuts, and means whereby the rods are held on the said rack members.

FUREL R. BURNS.